(12) United States Patent
Gomariz

(10) Patent No.: US 11,718,253 B1
(45) Date of Patent: Aug. 8, 2023

(54) BUMPER ATTACHMENT FOR RECEIVING A TRUCK ACCESSORY

(71) Applicant: Nexpro Trucks & Equipment Corp., Miami Lakes, FL (US)

(72) Inventor: Jorge Gomariz, Miami Lakes, FL (US)

( * ) Notice: Subject to any disclaimer, the term of this patent is extended or adjusted under 35 U.S.C. 154(b) by 26 days.

(21) Appl. No.: 17/577,535

(22) Filed: Jan. 18, 2022

(51) Int. Cl.
*B60R 19/38* (2006.01)
*B60R 19/02* (2006.01)

(52) U.S. Cl.
CPC ............ *B60R 19/38* (2013.01); *B60R 19/023* (2013.01)

(58) Field of Classification Search
CPC ....... B60R 19/38; B60R 19/023; B60R 19/48; B60D 1/56
USPC .......................... 293/117, 118, 102, 106, 114
See application file for complete search history.

(56) References Cited

U.S. PATENT DOCUMENTS

| | | | |
|---|---|---|---|
| 6,484,421 B1 * | 11/2002 | Donoghue | E01H 5/06 37/234 |
| 8,011,704 B2 * | 9/2011 | Nees | B60R 19/48 293/106 |
| 8,317,239 B2 | 11/2012 | Martin et al. | |
| 2010/0084878 A1 * | 4/2010 | Rusiniak | B66D 1/00 254/342 |
| 2022/0010510 A1 * | 1/2022 | Bergeron | B60R 19/48 |

* cited by examiner

*Primary Examiner* — Joseph D. Pape
*Assistant Examiner* — Veronica M Shull
(74) *Attorney, Agent, or Firm* — Sanchelima & Associates, P.A.; Christian Sanchelima; Jesus Sanchelima

(57) ABSTRACT

A bumper attachment for a truck accessory including a bumper assembly, a power systems assembly and an attachment assembly. The bumper assembly is coupled to the front end of a truck. The power assembly is mounted to the bumper assembly. The power assembly includes hydraulic connectors, blade connectors, and pneumatic. The attachment assembly is coupled to the bottom end of the truck and extends beyond the front end of the bumper. Furthermore, the attachment assembly includes a bracket and frame that can be positioned in various configurations to allow receive different attachments. The bracket can receive hydraulic and electronic attachments which are then operatively coupled to the power systems assembly.

19 Claims, 11 Drawing Sheets

BUMPER ATTACHMENT FOR RECEIVING A TRUCK ACCESSORY

1. Field of the Invention

The present invention relates to a bumper attachment for a truck accessory and, more particularly, to a bumper attachment for a truck accessory that includes a bumper attachment and an attachment assembly coupled to a truck.

2. Description of the Related Art

Several designs for a bumper attachment for a truck accessory have been designed in the past. None of them, however, include an attachment assembly including a bracket and a frame secured to the truck. The attachment assembly further including hydraulic cylinders configured to selectively position the bracket to receive hydraulic or electrical attachments to be mounted thereon.

Applicant believes that a related reference corresponds to U.S. Pat. No. 8,011,704B2 issued to for a bumper system and a beam including functional features, such as a storage pocket with lockable cover, lighting and accessory mounts, and electrical connectors. Applicant believes that another related reference corresponds to U.S. Pat. No. 8,317,239B2 issued for a flip-up bumper assembly for a motor vehicle having at least one attachment assembly, a support member, a bumper frame, a lift height adjustment member, and extendable member. None of these references, however, include a bumper attachment having power systems coupled thereon such as hydraulic line, air plug and pressurized water outlet.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a bumper attachment for a truck accessory that includes a bumper coupled to a truck and having power systems such as high pressure hydraulic lines, electric plug, compressed air plug and pressurized water outlet.

It is another object of this invention to provide a bumper attachment for a truck accessory that includes a bracket and a frame secured to a truck, the bracket is selectively positioned via hydraulic cylinders operatively operated by the power systems of the bumper attachment.

It is still another object of the present invention to provide a bumper attachment for a truck accessory that is capable of receiving an hydraulic or electric attachment and operatively coupled to the power systems of the bumper assembly.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an isometric operational view for one of the preferred embodiments of the present invention 10 showing bumper assembly 20 mounted to front of a truck and bracket assembly 40 mounted to the truck underneath the bumper assembly 20.

FIG. 2 shows an isometric view of the present invention 10 showing bracket assembly 40 mounted underneath the bumper assembly 20.

FIG. 2A isometric exploded view of the present invention showing bumper assembly 20 and bracket assembly 40.

FIG. 3 illustrates a side view of the present invention 10 showing the bracket assembly 40 mounted underneath bumper assembly 20.

FIG. 4 is a representation of a top view of the bumper assembly 20 showing bumper doors 25 hingedly mounted to top portion of bumper casing 21.

Figure 6:
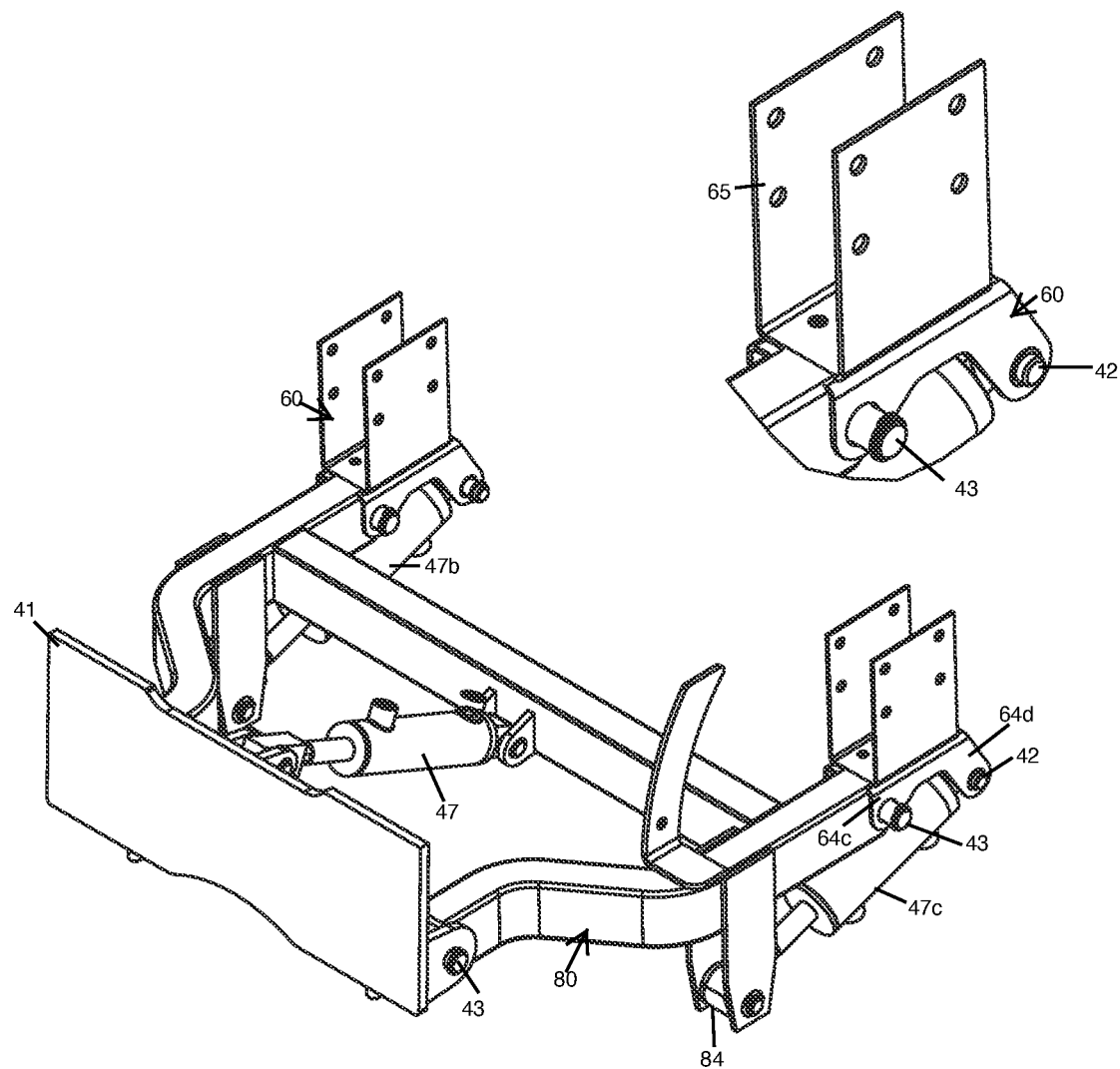

FIG. 6 is an isometric view of the bracket assembly 40 depicting actuators 47b and 47c coupled to chassis bracket assembly 60 and to bracket frame assembly 80. Actuator 47 is coupled to chassis bracket frame assembly 80 and to bracket plate 41.

Figure 7:
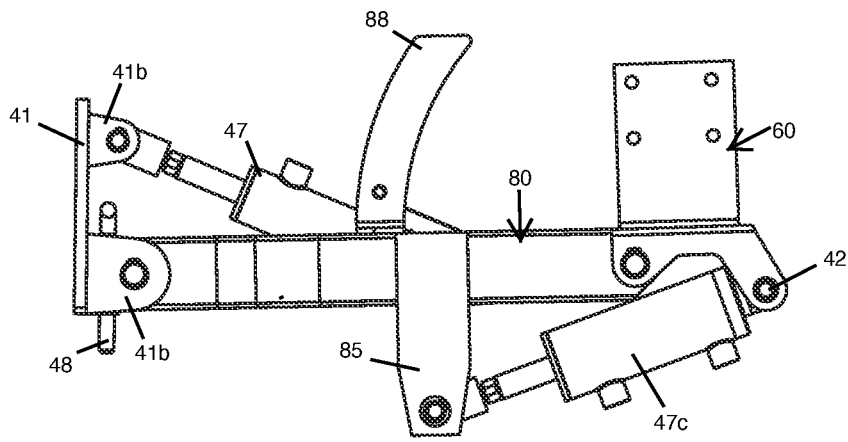

FIG. 7 is a side view of the bracket frame assembly 80 mounted to chassis bracket assembly 60.

Figure 7A:
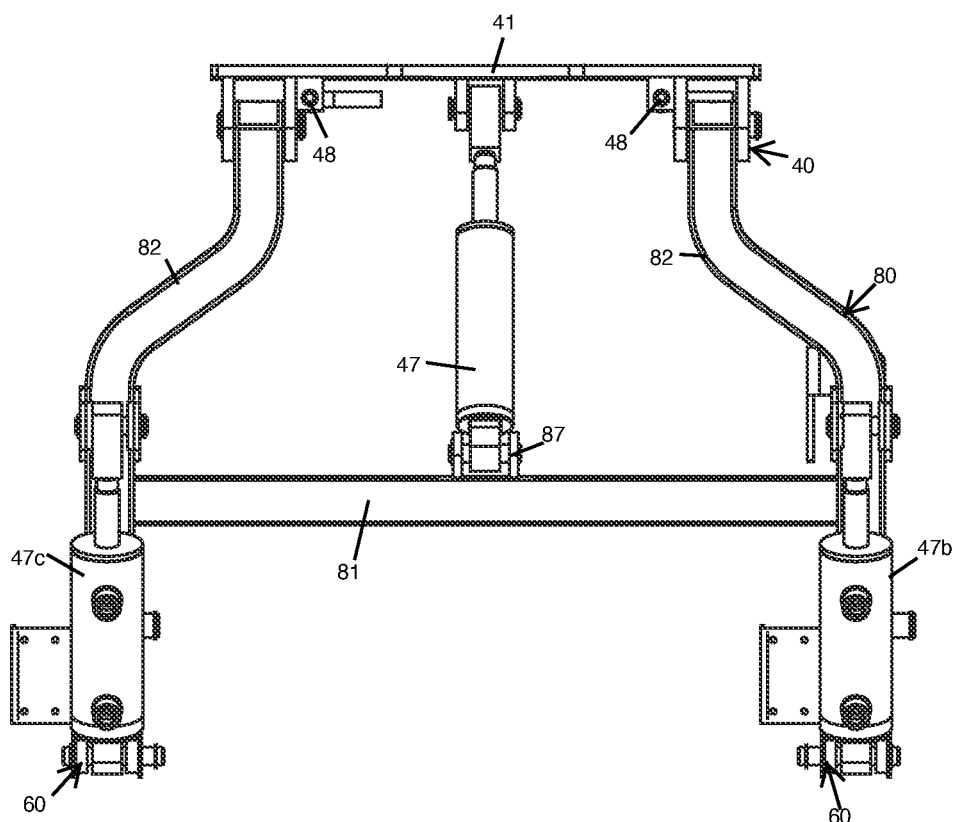

FIG. 7A is a bottom view of the bracket assembly 40 showing actuator 47 coupled to bracket plate 41 and to bracket frame assembly 80.

Figure 8:
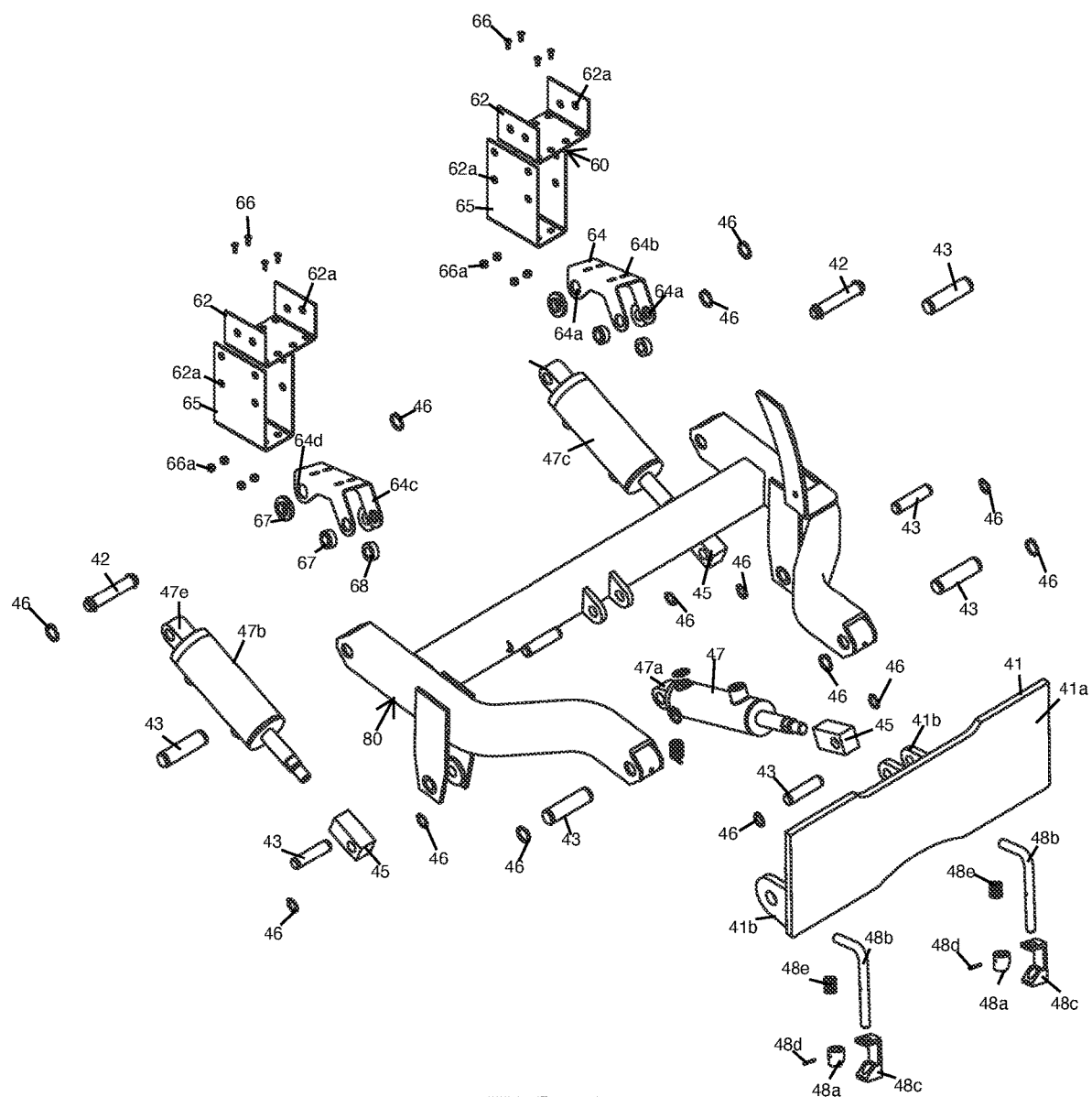

FIG. 8 is an exploded view of the bracket assembly 40 and bracket chassis assembly 60.

Figure 9:
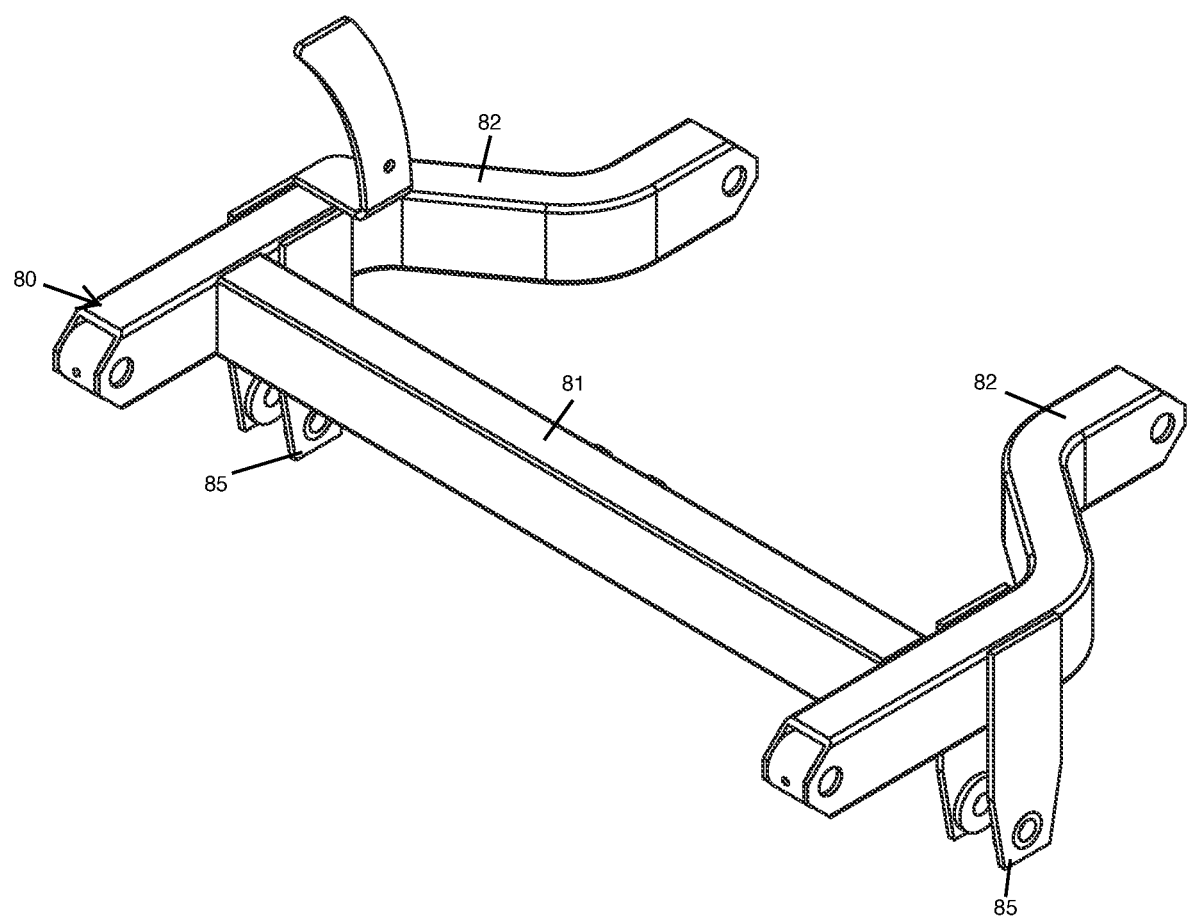

FIG. 9 is an enlarged view of the bracket frame assembly 80.

Figure 10:
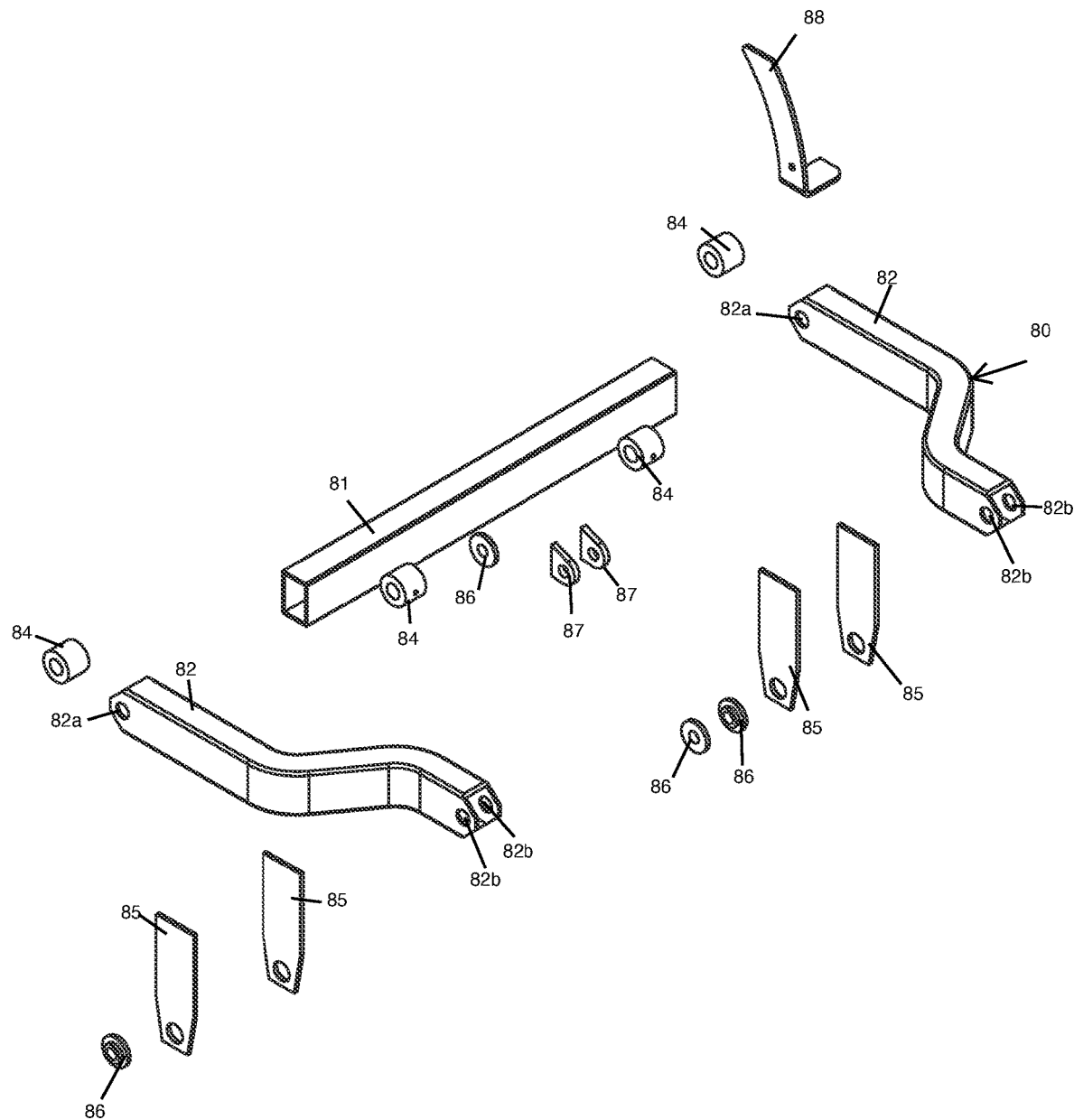

FIG. 10 is an exploded view of the frame of the bracket frame assembly 80.

V. DETAILED DESCRIPTION OF THE EMBODIMENTS OF THE INVENTION

Referring now to the drawings, where the present invention is generally referred to with numeral 10, it can be observed that it basically includes bumper assembly 20, bracket assembly 40, chassis bracket assembly 60, bracket frame assembly 80 and power systems assembly 90. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Bumper assembly 20 includes bumper casing 21, front bumper 22, bumper frame 23, bumper boxes 24, bumper doors 25, bumper hinges 26 bracket bumpers 27, bracket pin lock 28, left bumper cover 29 and right bumper cover 29a. In a preferred embodiment, bumper casing 21 may be made of a sheet metal. Preferably bumper casing 21 may be made of an alloy steel 14 gauge. It also may be suitable to manufacture the bumper casing 21 with stainless steel, carbon fibers, aluminum, other alloys or any other resistant malleable material or any other material suitable for manufacturing mechanical structures. Bumper casing 21 may have a coating to prevent corrosion. Bumper casing 21 may have a coating. Sheet metal for bumper casing 21 may be shaped with die cutting to a predetermined form of curves and lines. A top portion of bumper casing 21 may include first bumper opening 21 and second bumper opening 21b. First bumper opening 21a and second bumper opening 21b may be manufactured with blanking die cutting or any metal cutting method known in the prior art. First bumper opening 21a and second bumper opening 21b may have a rectangular shape or any other shape. Bumper casing 21 may be deformed with a bending machine defining bumper casing 21 defining an upper continuous portion, a left lower portion and a right lower portion. Left and right lower portions of bumper casing 21 may be separated.

Bumper frame 23 may be made of a rounded tube of an alloy steel, carbon fibers, stainless steel or any other material suitable for manufacturing mechanical structures. Bumper frame 23 may have a coating to prevent corrosion. Bumper frame 23 may have a shape substantially similar to shape defined by upper continuous portion, left and right lower portions of bumper casing 21. A lower portion of bumper frame 23 may be stepped shape. Bumper frame 23 may be shaped and manufactured with a bending machine. Bumper frame 23 may be attached to front edge of bumper casing 21 using welding, bolts, rivets or any other suitable attaching method known in the prior art. Front bumper 22 may be a shape substantially similar than bumper frame 23. Front bumper 22 may be slightly smaller than bumper frame 23 so bumper frame 23 may enclose front bumper 22.

Front bumper 22 may include third bumper opening 22a, fourth bumper opening 22b, fifth bumper opening 22c, sixth bumper opening 22d, seventh bumper opening 22e, eight bumper opening 22f and a first plurality of openings 22g. Third bumper opening 22a and eight bumper opening 22f may have a circular shape or any other shape. Fourth bumper opening 22b, fifth bumper opening 22c, sixth bumper opening 22d and seventh bumper opening 22e may have a rectangular shape or any other shape. Fourth bumper opening 22b and seventh bumper opening 22e may have substantially same length and width. Fifth bumper opening 22c and sixth bumper opening 22d may have substantially same width and length. Fifth bumper opening 22c and sixth bumper opening 22d may be smaller than fourth bumper opening 22b and seventh bumper opening 22e. Third bumper opening 22a may be located on a left upper portion of front bumper 22. Fourth bumper opening 22b may be located to the right of third bumper opening 22a. Fifth bumper opening 22c may be located to the right of fourth bumper opening 22b. Plurality of openings 22g may be located on a middle portion of front bumper 22. Plurality of openings 22g may have a circular shape or any other shape. Eight bumper opening 22f may be located on a right upper portion of front bumper 22. Seventh bumper opening 22e may be located to the left of eight bumper opening 22f. Sixth bumper opening 22d may be located between plurality of openings 22g and seventh bumper opening 22e.

Bumper doors 25 may have a rectangular shape or any other shape. Bumper doors 25 may be made of sheet metal. Bumper doors 25 may include a door hole for handling door. One of the bumper doors 25 may be hingedly attached to first bumper opening 21a via hinge 26. Another of the bumper doors 25 may be hingedly attached to second bumper opening 21b via hinge 26. One of the bumper boxes 24 may be attached to an interior left upper portion of the bumper casing 21 underneath first bumper opening 21a. Another of the bumper boxes 24 may be attached to an interior right portion of the bumper casing 21 underneath second bumper opening 21b. Bumper boxes 24 may be welded or attached by any other suitable method such as rivets, bolts or the like. One of the bracket bumpers 27 may be attached to an interior side of bumper casing 21 between fourth bumper opening 22b and fifth bumper opening 22c. Another of the bracket bumpers 27 may be attached to an interior side of bumper casing 21 between sixth bumper opening 22d and seventh bumper opening 22e. Bracket bumpers 27 may be attached by welding, rivets, bolts or any other method known in the prior art. Bracket pin lock 28 may be located next to fifth bumper opening 22c.

First bumper cover 29 may have a rectangular shape. In one embodiment, first bumper cover 29 may be made of aluminum 6061. It also may be suitable to have first bumper cover 29 being made of steel, carbon fibers or any other material suitable for manufacturing mechanical structures. First bumper cover 29 may have a first cover opening 29b having a circular shape. First cover opening 29b may be located on a left upper portion of first bumper cover 29. First bumper cover 29 may further include a cover slot 29c having a rectangular shape. Second bumper cover 29a may have a rectangular shape. In one embodiment, second bumper cover 29a may be made of aluminum 6061. It also may be suitable to have second bumper cover 29a being made of steel, carbon fibers or any other material suitable for manufacturing mechanical structures. Second bumper cover 29a may have a second cover opening 29d having a circular shape. Second cover opening 29d may be located on a middle portion of second bumper cover 29a. First bumper cover 29 may be attached to fourth opening 22b. Second bumper cover 29a may be attached to seventh opening 22e.

Power systems assembly 90 includes hose coupling 91, lights 92, pneumatic connector 93, cam lock 94, hydraulic connector 95 and blade connector 96. Lights 92 may be LED lights, fluorescent lights, halogen lights or any other kind of lights. Lights 92 may be mounted on third opening 22a and eight opening 22f. Pneumatic connector 93, cam lock 94, hydraulic connector 95 and blade connector 96 may be mounted to first bumper cover 29 and second bumper cover 29a. Cain lock 94 is weather resistant. Hydraulic connector 95 may be a hydraulic quick connector. Hydraulic connector 95 may be connected to a hydraulic line. Blade connector 96 may be connected to an electrical power source. Hose coupling 91 may be connected to a water pressurized outlet. Pneumatic connector 93 may be connected to a pneumatic line.

Referring now to FIG. 10 and FIG. 9, bracket frame assembly 80 includes horizontal arm 81, bracket arms 82, bracket bushings 84, bracket supports 85, bracket spacers 86, bracket ribs 87 and bar pin 88. In one embodiment, horizontal arm 81 may be a rectangular elongated tube. It also may be suitable for the horizontal arm 81 to be a cylindrical tube, a beam, a rod, or any other suitable elongated bar. Horizontal arm 81 may be made of an alloy steel stainless steel, carbon fibers, or any other material suitable for manufacturing mechanical structures. Horizontal arm 81 may have a protective coating. Each of bracket arms 82 may have a first straight portion connected to a curved portion. Curved portion of each bracket arm 82 is connected to a second straight portion. First and second straight portions of bracket arm 82 may be parallel. Bracket arm 82 may be made of a rectangular tube, a rod, a beam or the like. A rear end of each bracket arm 82 includes first frame openings 82a. A front end of each bracket arm 82 includes second frame openings 82b. Each of the bracket supports 85 may have a first rectangular portion connected to a trapezium portion with a third frame opening 85a. Bar pin 88 may be made of a metal sheet of alloy steel or other metals, carbon fibers, or the like. Bar pin 88 may also be made of any other material suitable for manufacturing mechanical structures. Bar pin 88 may have a first flat portion connected to a curved portion. Curved portion of bar pin 88 may have an opening. Bracket frame assembly 80 may be made of an alloy steel, carbon fibers, stainless steel or any other material suitable for manufacturing mechanical structures.

Bracket bushings 84 may be coupled to rear end of each of bracket arms 82 to reduce vibrations. Bracket bushings 84 may be coupled to frontend of each of bracket arms 82. First straight portion of a first of the bracket arms 82 may be attached to a first distal end of horizontal arm 81 using welding or any other suitable attaching method. First straight portion of a second of the bracket arms 82 may be attached to a second distal end of horizontal arm 81 using welding or any other suitable attaching method. A pair of the bracket ribs 87 may be attached to a front portion of horizontal arm 81 using welding or any other attaching method.

Each of the bracket spacers 86 may have a first cylindrical portion and a second cylindrical portion to couple to third frame opening 85*a* of one of the bracket supports 85. A pair of bracket supports 85 may be attached to first straight portion of each of the bracket arms 82 within horizontal arm 81 and curved portion. Bracket supports 85 may be attached to bracket arms 82 using welding or any other suitable attaching method. Flat portion of bar pin 88 may attached to one of the bracket arms 82 via welding or any other suitable attaching method. Bar pin 88 may be located next to pair of bracket supports 85 of one of the bracket arms 82.

Chassis bracket assembly 60 includes first top members 62 and lower members 64. In one embodiment, each first top member 62 may be made of metal sheet bended. Each first top member 62 may include second plurality of openings 62*a*. Each first top member 62 may include a base with a rectangular shape. A first distal end of the base of each first top member 62 may have a first lateral side perpendicular to base. A second distal end of the base of each first top member 62 may have a second lateral side perpendicular to base. First and second lateral sides of first top member 62 maybe parallel. First and second lateral sides of each first top member 62 may include the second plurality of openings 62*a*. Base of top members 62 may include the second plurality of openings 62*a*.

Lower members 64 may include a second base having a substantially rectangular shape. Lower members 64 may also include lateral sides with lower member openings 64*a*. Lateral sides of lower members 64 may include front lateral portions 64*c* and rear lateral portions 64*d*. Lateral sides of lower members 64 may be perpendicularly connected to lateral edges of second base of lower members 64. Lower member openings 64*a* may have a circular shape or any other shape. Each lower member opening 64*a* may receive one of first chassis bracket bushings 67 therein. Each of the first chassis bracket bushings 67 may have an opening to receive one of second chassis bracket bushings 68. Second base of lower members 64 may include slots 64*b*. Chassis bracket assembly 60 may be made of an alloy steel, carbon fibers, stainless steel or any other metal or alloy of metals. Chassis bracket assembly 60 may have a coating to prevent corrosion. Each of the first top members 62 may be attached to second base of one of the low members 64. In a preferred embodiment, screws 66 and locknuts 65 may cooperate to attach first top members 62 to low members 64 through slots 64*b* and second plurality of openings 62*a*. It also may be suitable to attach first top members 62 to low members 64 with welding, rivets or any other suitable attaching method known in the prior art. An alternative embodiment of the present invention 10 may include second top member 65 being attached to first top member 62 and lower member 64.

Referring now to FIGS. 6, 7, 7A, and 8, bracket assembly 40 includes bracket plate 41. Bracket assembly 40 may further include headless pins 42, pivot pins 43, knuckles 45, rings 46, actuators 47, 47*b*, and 47*c*, and bracket pin locks 48. Each bracket pin lock 48 may include pin tube 48*a*, pin 48*b*, pin support 48*c*, spring pin 48*d* and spring 48*e*. Pin 48*b* may have an elongated member and a short member being perpendicularly connected. Pin 48*b* may include pin opening to receive spring pin 48*d* therein. Pin support 48*c* may have a base with first pin support opening and a top portion with a second support opening to receive elongated member of pin 48*b* therein. Pin tube 48*a* may be cylindrical and hollow. Pin tube 48*a* may be coupled to base of pin support 48*c*. Pin tube 48*a* may have a pin tube opening to receive spring pin 48*d*. Spring pin 48*d* may secure pin tube 48*a* and pin 48*b*. Spring 48*e* may be received by pin 48*b*.

Bracket plate 41 may include plate 41*a* and bracket couplers 41*b*. Plate 41*a* may have a substantially rectangular shape with a curved cut on one edge of at least one side. Plate 41*a* may be flat. It also may be suitable to have plat 41*a* having a circular shape, a trapezium shape, an irregular shape or any other suitable shape. Each bracket couplers 41*b* may have an opening. Bracket couplers 41*b* may be attached to a rear side of plate 41*a* by welding or any other suitable attaching method such as bolts, rivets or the like. A first pair of the bracket couplers 41*b* may be located on a left lower portion of plate 41*a*. A second pair of the bracket couplers 41*b* may be located on a right lower portion of plate 41*a*. A third pair of the bracket couplers 41*b* may be located on an upper middle portion of plate 41*a*. Each pair of the bracket couplers 41*b* may have a predetermined distance. Bracket plate 41 may be made of an alloy steel, stainless steel, carbon fibers, or any other material suitable for manufacturing mechanical structures. Bracket plate 41 may have a coating.

In a preferred embodiment, actuators 47, 47*b* and 47*c* may be hydraulic cylinders. It also may be suitable to have actuators 47, 47*b* and 47*c* being pneumatic cylinders, electric motors, combustion motors, or any other suitable actuator known in the prior art. Actuators 47, 47*b* and 47*c* may include a front end with a shaft. Actuators 47, 47*b* and 47*c* may include an actuator rear end 47*a* actuator opening. Knuckles 45 may have a cuboid shape. Knuckles 45 may be coupled to shaft of actuators 47, 47*b* and 47*c*.

Rear end of each bracket arm 82 may have front lateral portions 64*c* of lower member 64 of chassis bracket assembly 60 pivotally connected via one of pivot pins 43. Front end of a first of bracket arms 82 may have first pair of bracket couplers 41 pivotally connected via one pivot pin 43. Front end of a second of bracket arms 82 may have second pair of bracket couplers 41 pivotally connected via one pivot pin 43. Bracket plate 41 may be pivotally coupled to bracket frame assembly 80. Rear lateral portion 64*d* of lower member 64 of left bracket arm 82 may have actuator rear end 47*a* of actuator 47*b* pivotally connected therein via one headless pin 42. Rear lateral portion 64*d* of lower member 64 of right bracket arm 82 may have actuator rear end 47*a* of actuator 47*c* pivotally connected therein via one headless pin 42. Actuators 47*b* and 47*c* may be pivotally coupled to bracket supports 85 of each bracket arm 82 via one headless pin 42. Rear end 47*a* of actuator 47 may be pivotally connected to bracket ribs 87 bracket frame assembly 80 via one pivot pin 43. Knuckle 45 may pivotally couple Shaft of actuator 47 to third pair of bracket couplers 41b located on upper middle portion of plate 41a.

Figure 1:
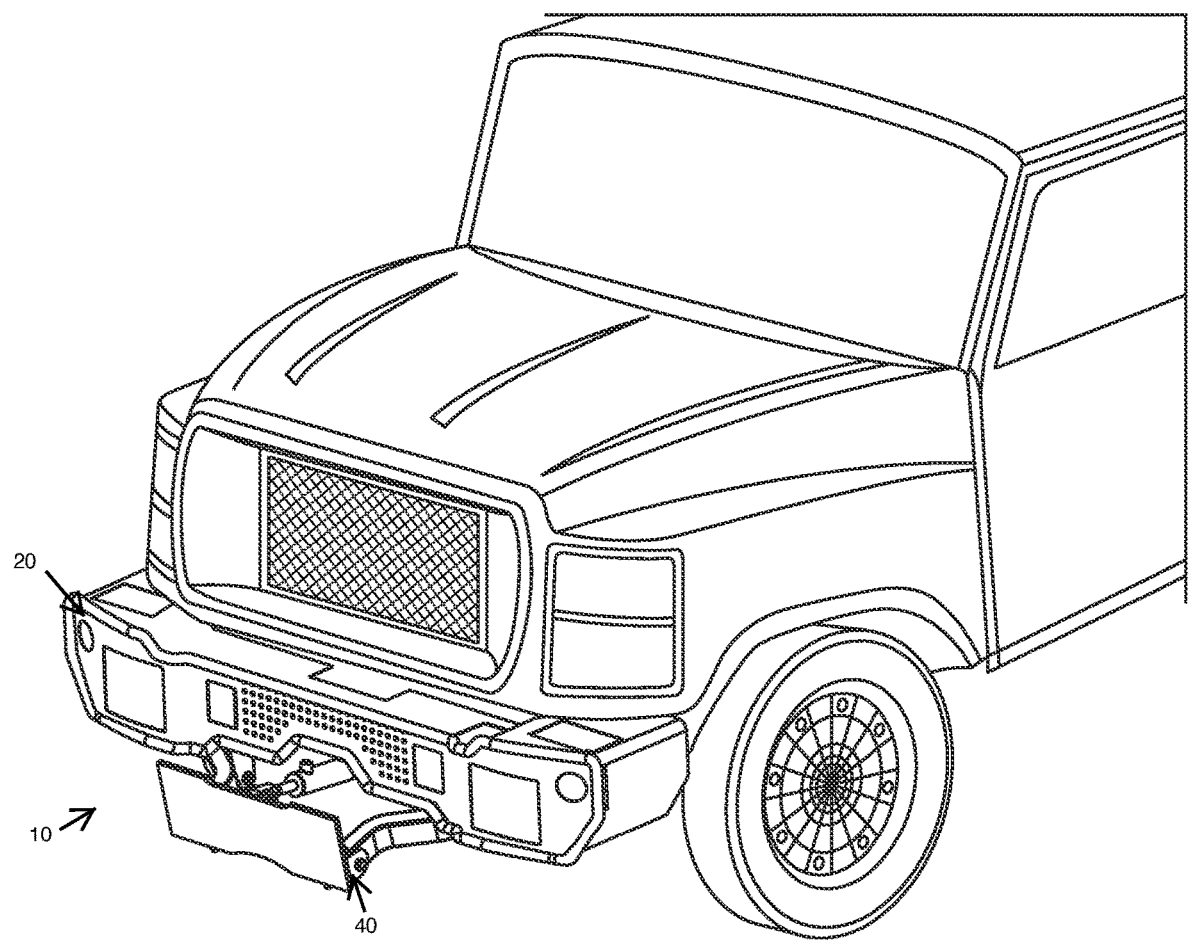
Figure 2:
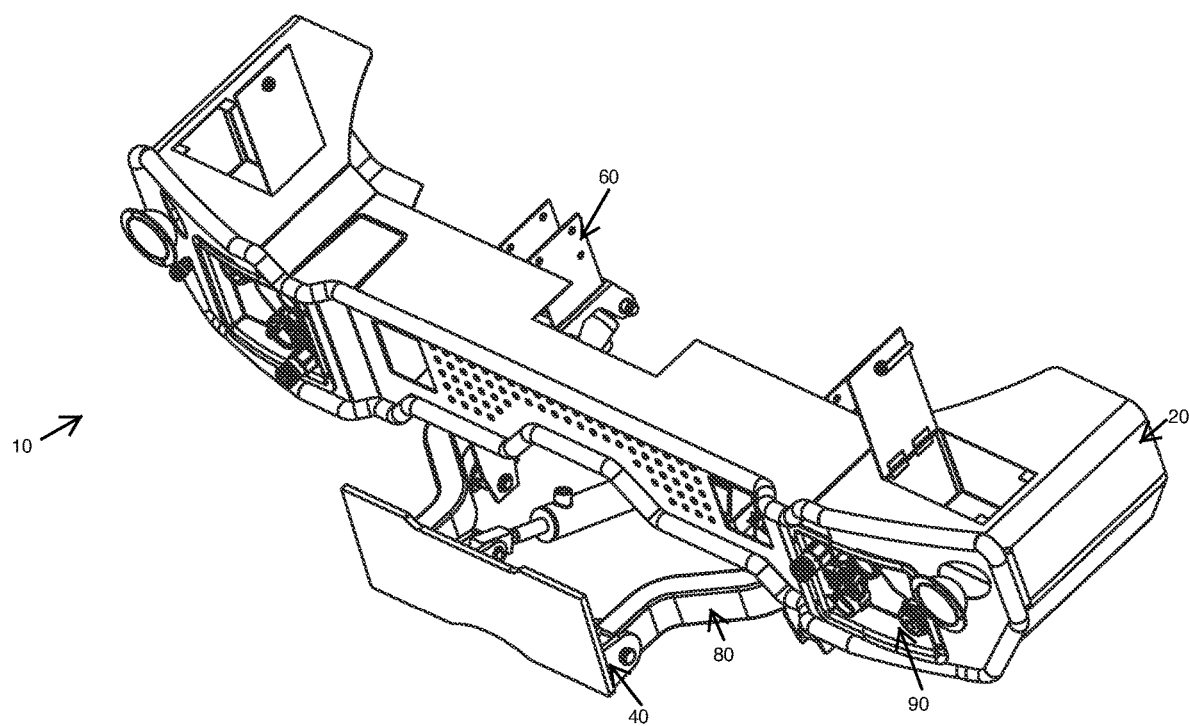
Figure 2A:
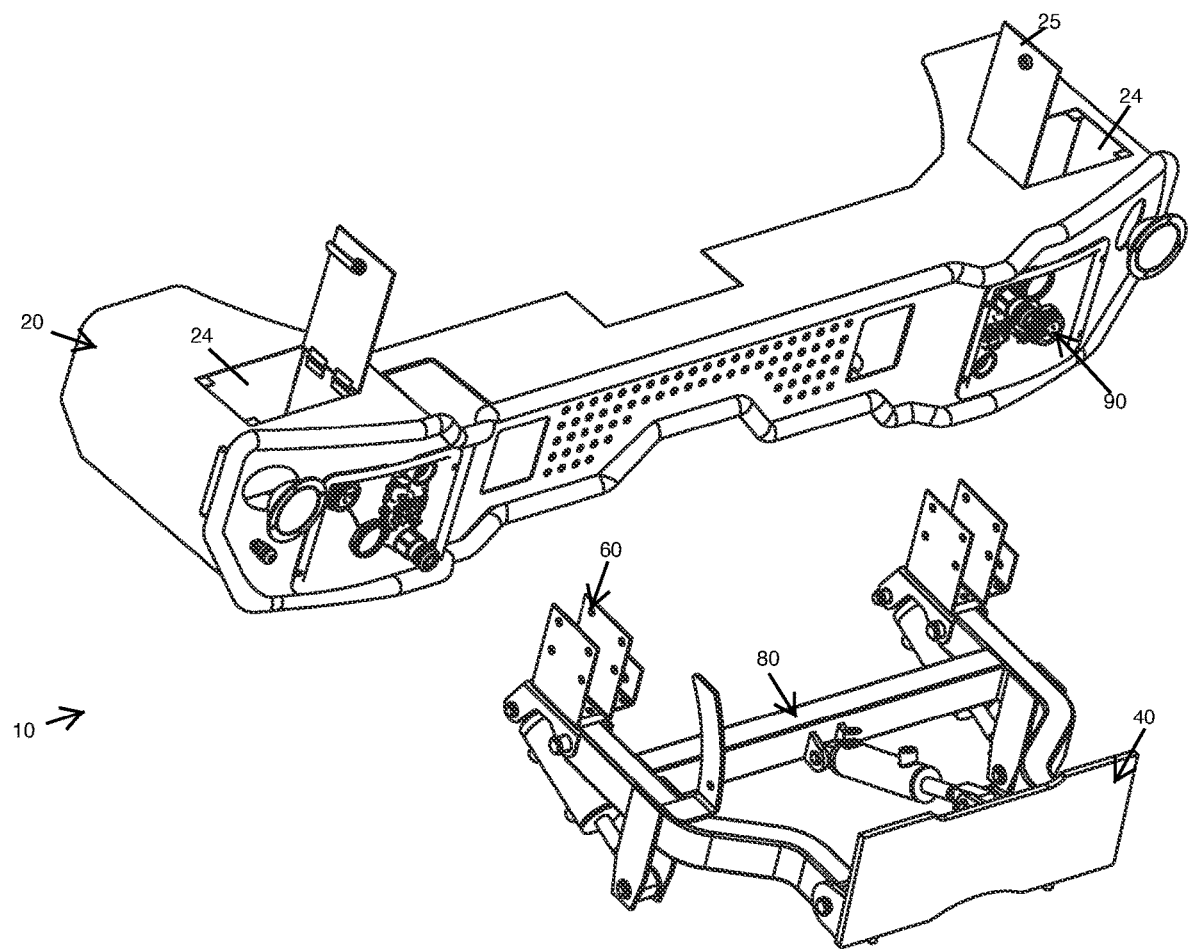
Figure 3:
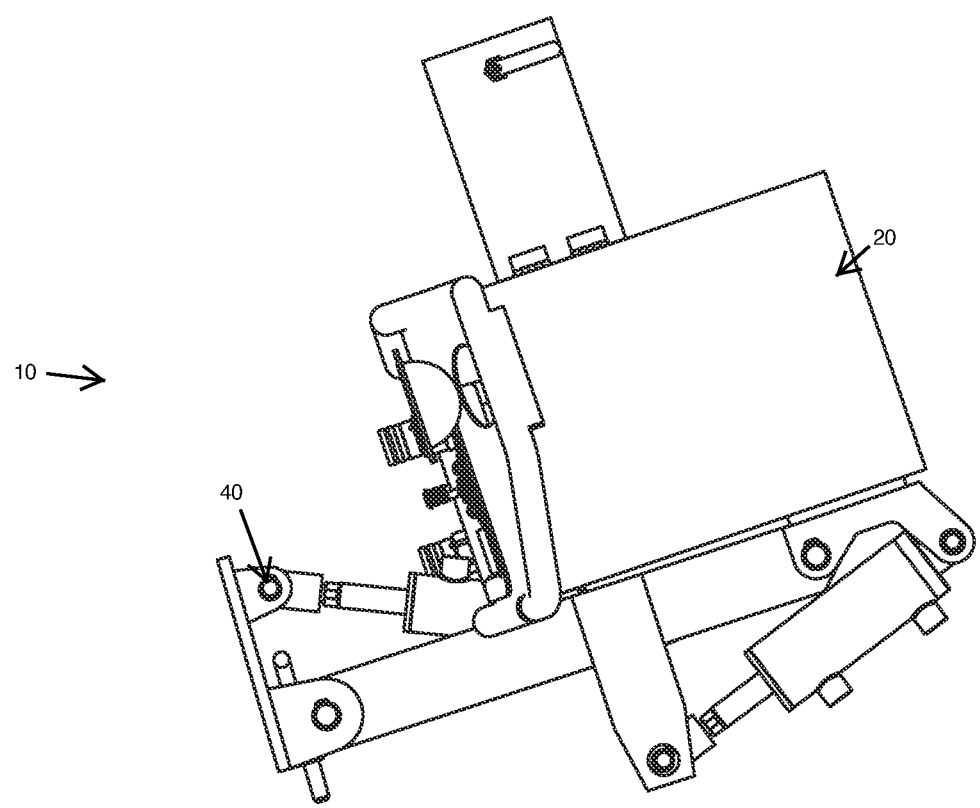
Figure 4:
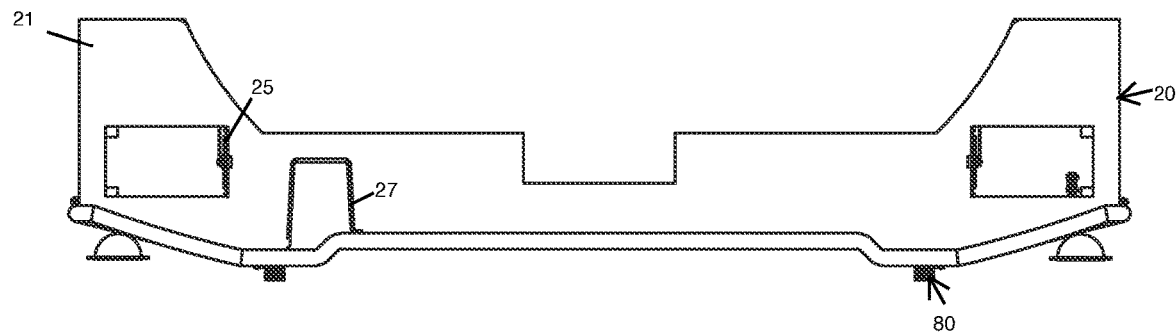
FIG. 4A is a front view of the bumper assembly 20 showing power systems assembly 90 mounted thereon.
FIG. 4B is a side view of the bumper assembly 20 with bumper doors 25 in an opened configuration.
Figure 4A:
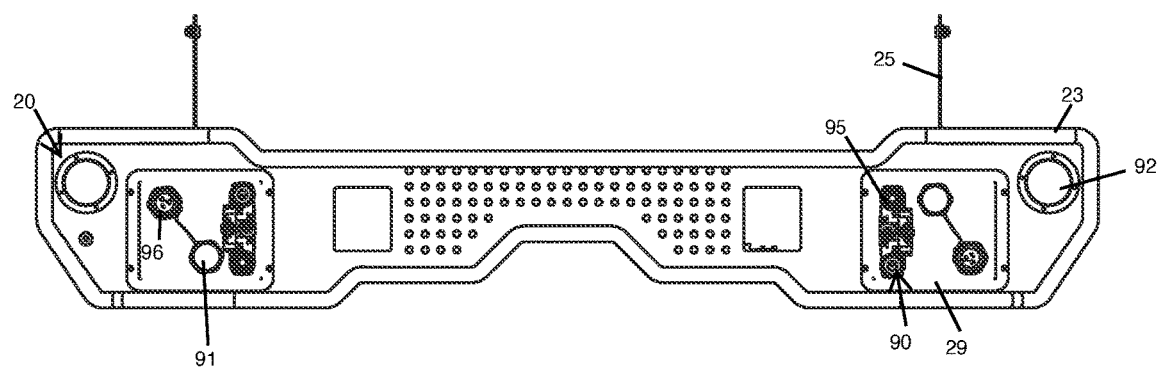
Figure 4B:
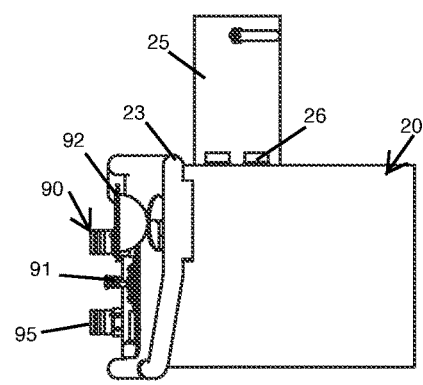
Figure 5:
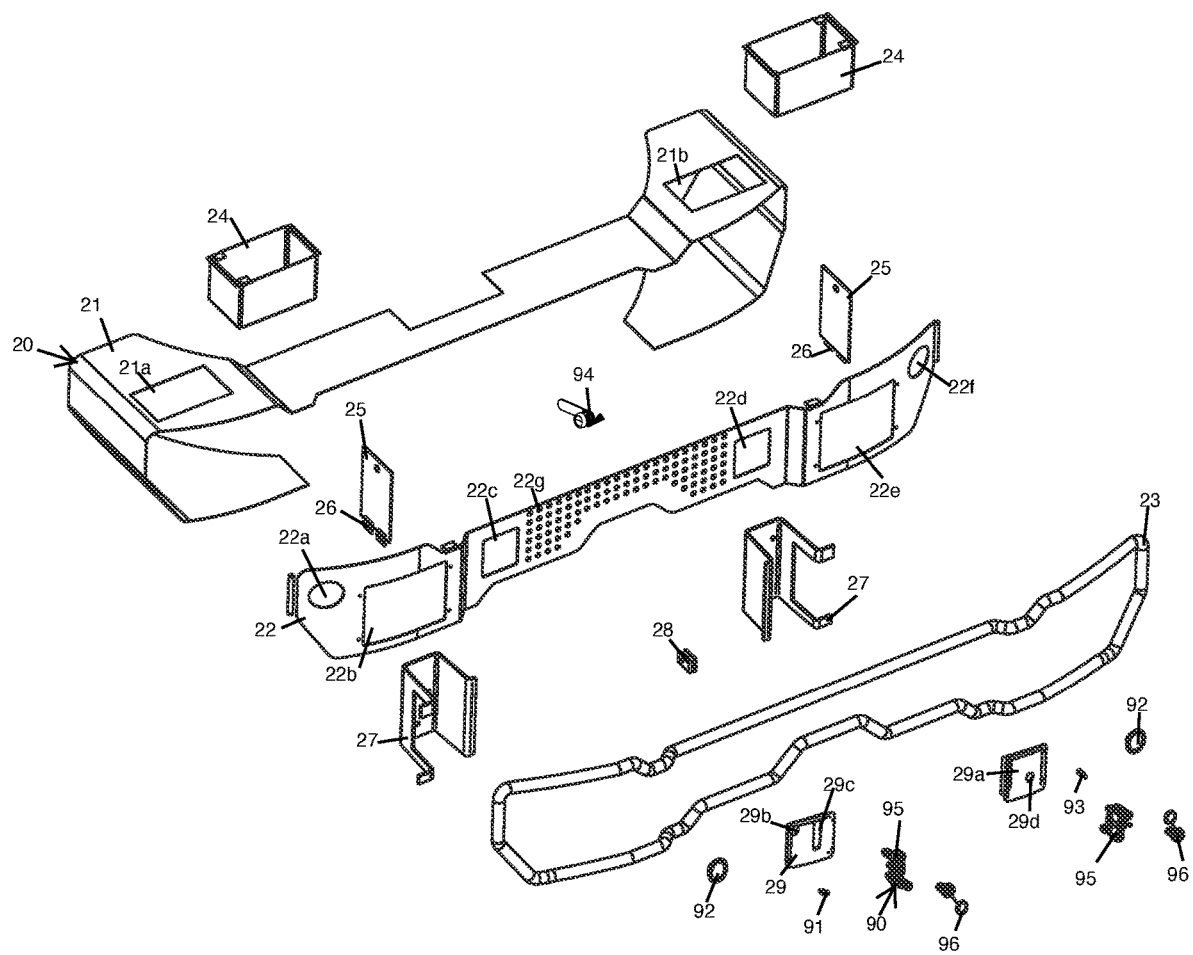
FIG. 5 is an exploded view of the bumper assembly 20 and power systems assembly 90.

Referring now to FIG. 1. Bumper assembly 20 may be attached to front end of truck. Chassis bracket assembly 60 may be mounted to truck underneath bumper assembly 20. Actuators 47, 47b and 47c may be actuated by hydraulic pressure provided via hydraulic connectors 95. Actuators 47b and 47c may rotate bracket frame assembly 80 around pivot pins 43 of front lateral portions 64c of chassis bracket assembly 60. Actuator 47 may rotate bracket plate 41 around pivot pins 43 of front ends of bracket arms 82. Bracket plate 41 may receive hydraulic or electric attachments to be mounted thereon. The hydraulic or electric attachments may be operatively coupled to the power systems 90 of the bumper assembly 20. It should be noted that the bracket plate 41 may be positioned into any suitable rotatory position driven by the actuators 47, 47b and 47c. Actuators 47, 47b and 47c may drive the bracket plate 41 to a parallel position, to a perpendicular position or to an inclined position with respect a front plane of the truck, and upwards or downwards. Actuators 47, 47b and 47c may allow the bracket plate 41 to move around two rotational joints along a same plane, thereby defining a universal coupling system. The universal coupling system allows to couple to the bracket plate any attachment such as but not limited to any kind of bucket, snow brooms, bucket brooms, cattle yard brooms, post holes attachments, tree planting attachments, super digger legs, mixer bowl, auger extension, augers, trenchers, vibrating plough, towbar, rock grab, kanga hoes, lawn aerator, slasher, rotating log grab, turf cutter, borers, stump grinder, angle blades, rotary tiller, tow hitch, ripper, multitool bar tool carrier, concrete grinder, dump bin, block grab, forks, rammer post driver, kerf lifter, snow blower, rock breaker, debris puller, drum handler, any mini skid steer attachment or any other suitable attachment known in the prior art.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A bumper attachment for a truck accessory, comprising:
   A) a bumper assembly including a front bumper having openings, said bumper assembly is attached to a front portion of a truck;
   B) a power systems assembly including at least one pneumatic connector, at least one hydraulic connector, and at least one blade connector, said power system is operatively mounted to the openings of the front bumper;
   C) a chassis bracket assembly including a chassis bracket being mounted to said truck underneath said bumper assembly;
   D) a bracket frame assembly including a bracket frame pivotally mounted to said chassis bracket assembly; and
   E) a bracket assembly including a bracket plate, said bracket plate is pivotally mounted to said bracket frame assembly, said bracket assembly further including actuators to selectively position said bracket plate and said bracket frame assembly, said bracket plate receiving actuator attachments being operatively coupled to the power systems assembly.

2. The bumper attachment for a truck accessory of claim 1, wherein said actuators are hydraulic cylinders.

3. The bumper attachment for a truck accessory of claim 1, wherein said bumper assembly further includes a bumper casing and a bumper frame, said bumper frame is attached to said bumper casing, said bumper frame encloses said front bumper.

4. The bumper attachment for a truck accessory of claim 3, wherein said bumper casing includes a first bumper opening and a second bumper opening.

5. The bumper attachment for a truck accessory of claim 4, wherein said bumper assembly further includes bumper boxes and bumper doors, said bumper boxes are located underneath said first bumper opening and second bumper opening, wherein said first bumper opening has a first of the bumper doors hingedly attached therein, said second bumper opening includes a second of said bumper doors hingedly attached therein.

6. The bumper attachment for a truck accessory of claim 1, wherein said bracket frame assembly includes a pair of bracket arms attached to a horizontal arm, thereby defining said bracket frame.

7. The bumper attachment for a truck accessory of claim 6, wherein said bracket plate is pivotally connected to front edges of said bracket arms.

8. The bumper attachment for a truck accessory of claim 7, wherein said bracket frame assembly further includes bracket supports attached to each of said bracket arms.

9. The bumper attachment for a truck accessory of claim 8, wherein at least one of said actuators is pivotally connected to said bracket frame assembly and to at least one of said bracket supports.

10. The bumper attachment for a truck accessory of claim 8, wherein one of said actuators is pivotally connected to said horizontal arm and to an upper portion of said bracket plate.

11. The bumper attachment for a truck accessory of claim 10, wherein said actuators drive the bracket plate to a predetermined position defining a universal coupling system allowing a coupling of an attachment for a mini skid steer.

12. A bumper attachment for a truck accessory, comprising:
   A) a bumper assembly including a front bumper, a bumper frame, a bumper casing, at least one bumper box and at least one bumper door, said front bumper having openings, said bumper frame being attached to said bumper casing, said front bumper being attached to said bumper frame, said bumper casing including at least one bumper opening, said at least one door being hingedly attached to said at least one opening, said bumper assembly being attached to a front portion of a truck;
   B) a power systems assembly including at least one pneumatic connector, at least one hydraulic connector, and at least one blade connector, said power system being operatively mounted to the plurality of openings of the bumper assembly;
   C) a chassis bracket assembly including a chassis bracket being mounted to said truck underneath said bumper assembly;
   D) a bracket frame assembly including a bracket frame pivotally mounted to said chassis bracket assembly; and
   E) a bracket assembly including a bracket plate, said bracket plate being pivotally mounted to said bracket frame assembly, said bracket assembly further including actuators to selectively position said bracket plate and said bracket frame assembly, said bracket plate receiving actuators attachments being operatively coupled to the power systems assembly.

13. The bumper attachment for a truck accessory of claim 12, wherein said bracket frame assembly includes a pair of bracket arms attached to a horizontal arm, thereby defining said bracket frame.

14. The bumper attachment for a truck accessory of claim 13, wherein said bracket plate is pivotally connected to front edges of said bracket arms.

15. The bumper attachment for a truck accessory of claim 14, wherein said bracket frame assembly further includes bracket supports attached to each of said bracket arms.

16. The bumper attachment for a truck accessory of claim 15, wherein at least one of said actuators is pivotally connected to the bracket frame assembly and to at least one of said bracket supports.

17. The bumper attachment for a truck accessory of claim 15, wherein one of said actuators is pivotally connected to said horizontal arm and to an upper portion of said bracket plate.

18. The bumper attachment for a truck accessory of claim 17, wherein said actuators drive the bracket plate to a predetermined position defining a universal coupling system allowing to couple an attachment for a mini skid steer.

19. A bumper attachment for a truck accessory, consisting of:
A) a bumper assembly including a front bumper, a bumper frame, a bumper casing, at least one bumper box and at least one bumper door, said front bumper having openings, said bumper frame is attached to said bumper casing, said front bumper is attached to said bumper frame, said bumper casing includes at least one bumper opening, said at least one door is hingedly attached to said at least one opening, said bumper assembly is attached to a front portion of a truck;
B) a power systems assembly including at least one pneumatic connector, at least one hydraulic connector, and at least one blade connector, said power system is operatively mounted to the plurality of openings of the bumper assembly;
C) a chassis bracket assembly including a chassis bracket being mounted to said truck underneath said bumper assembly;
D) a bracket frame assembly including a pair of bracket arms and an horizontal arm, a first bracket arm of said pair of bracket arms is welded to a first distal end of said horizontal arm, a second bracket arm of said pair of bracket arms is welded to a second distal end of said horizontal arm, said bracket frame assembly further includes bracket supports welded to each bracket arm of said pair of bracket arms, each bracket arm of said pair of bracket arms is pivotally mounted to said chassis bracket assembly; and
E) a bracket assembly including a bracket plate, wherein said bracket plate is pivotally connected to front edges of each bracket arm of said pair of bracket arms, said bracket assembly further including a first hydraulic cylinder, a second hydraulic cylinder and a third hydraulic cylinder, said first hydraulic cylinder and said second hydraulic cylinder pivotally connect the bracket frame assembly and bracket supports, said first hydraulic cylinder selectively position said bracket frame assembly, said third hydraulic cylinder connects actuators to selectively position said bracket plate and said bracket frame assembly, said third hydraulic cylinder is pivotally connected to said horizontal arm and to an upper portion of said bracket plate, said bracket plate receiving actuator attachments being operatively coupled to the power systems assembly.

* * * * *